United States Patent Office 3,060,684
Patented Oct. 30, 1962

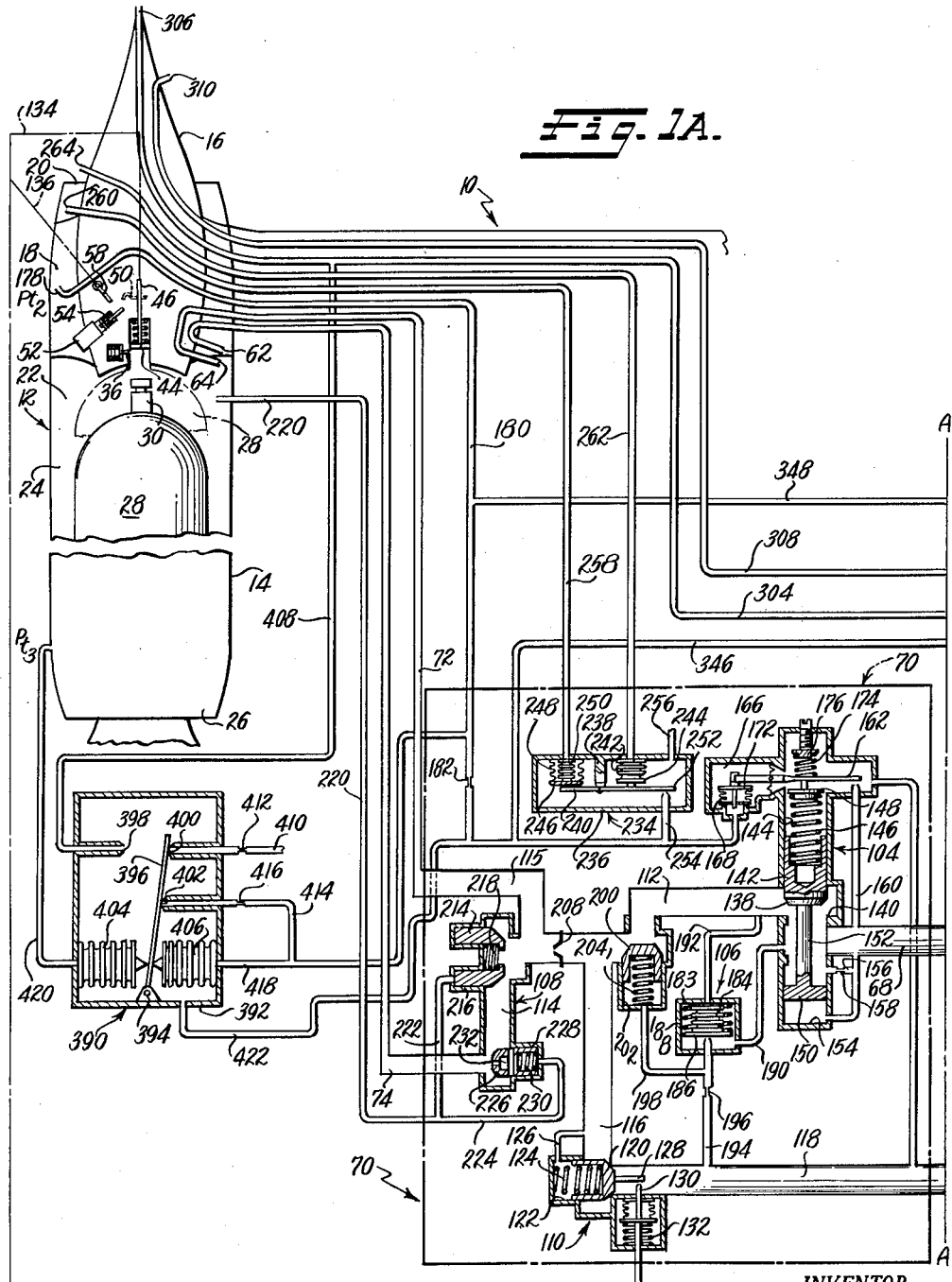

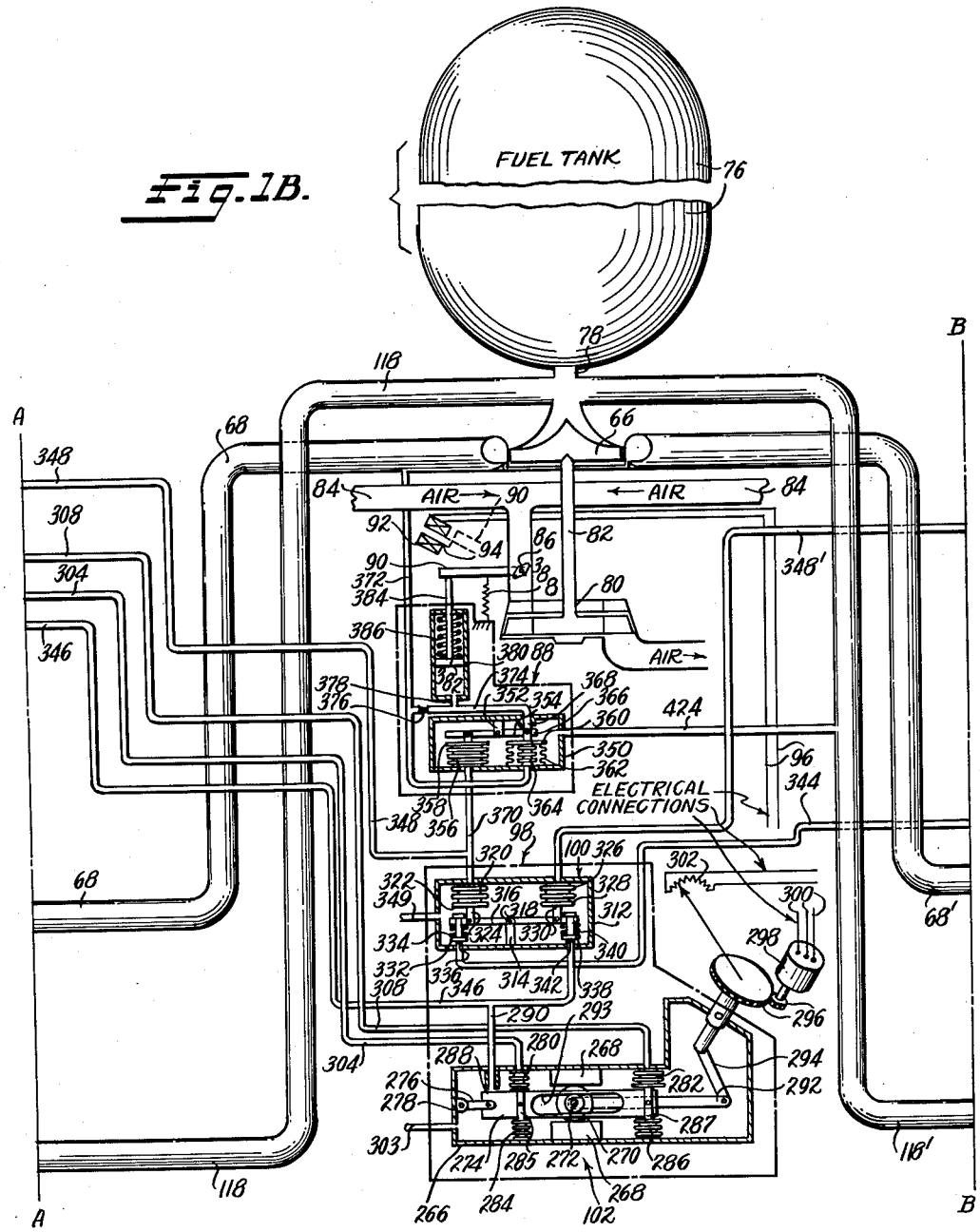

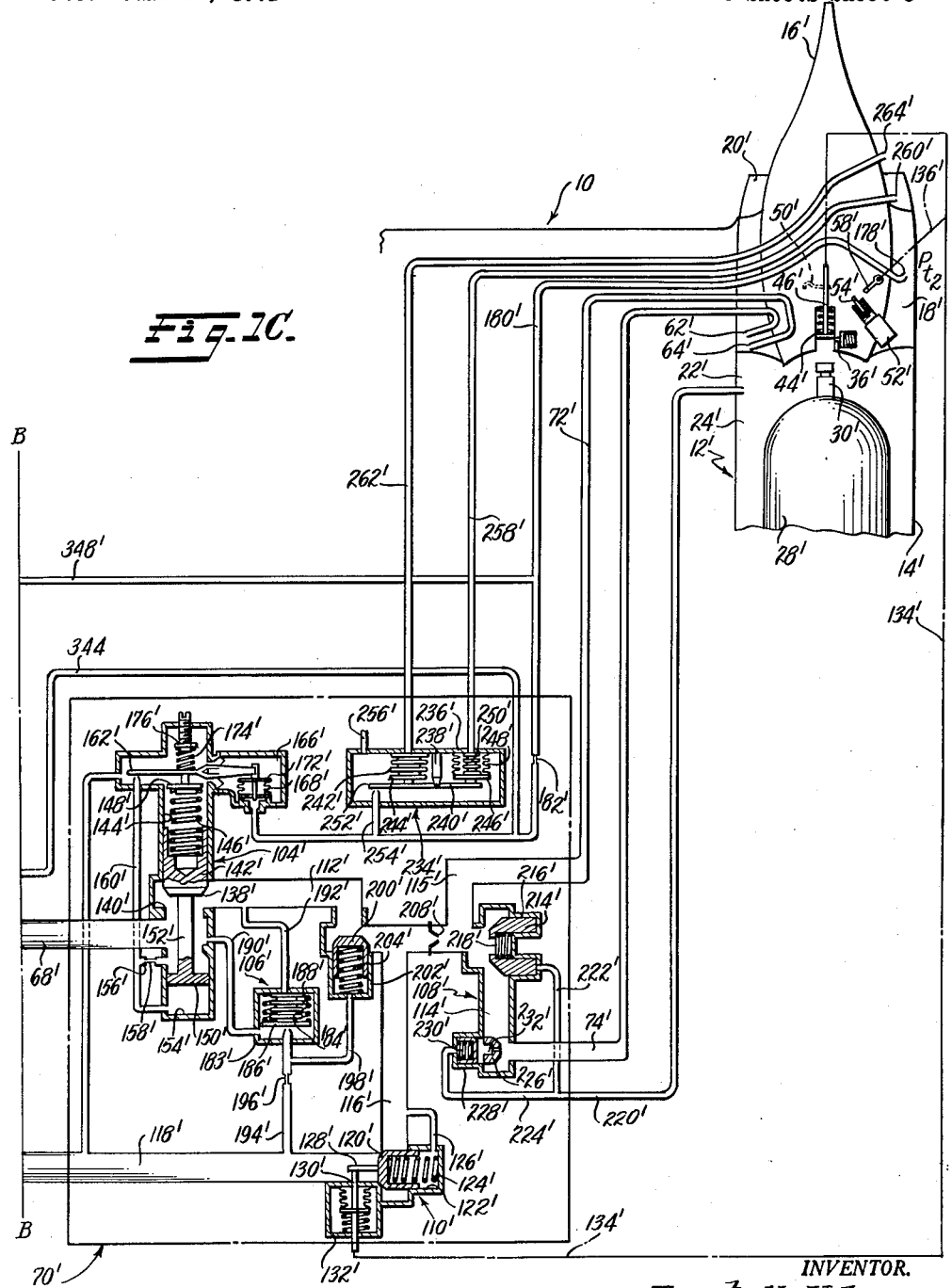

3,060,684
CONTROL FOR MISSILE HAVING A PLURALITY OF JET ENGINES
Trent H. Holmes, Rocky Hill, Conn., assignor to United Aircraft Corporation, East Hartford, Conn., a corporation of Delaware
Filed Jan. 27, 1961, Ser. No. 85,282
42 Claims. (Cl. 60—35.6)

This invention relates to a novel control system for a jet engine, and more specifically to a fuel flow and control system for a dual ramjet engine powered missile adapted for launching from a ground installation, or from a mother ship which may include an airplane, submarine or surface ship.

Ramjets are not operable under their own power at low speeds, and for this reason require an auxiliary power plant, such as a booster rocket, for launching to bring the ramjet engine up to a self operating speed. Before the ramjet engine becomes self operating, and thereafter, certain controls must become effective to (1) start the fuel pump, (2) initiate combustion, (3) eject or jettison the launching rocket, and (4) control the fuel feed according to a prearranged schedule during acceleration until a predetermined speed is attained and thereafter maintain the predetermined speed. In the case of a missile powered by a pair of ramjet engines, it is important that the power output of the two engines be equalized to avoid the creation of yaw conditions of the missile.

It is an object of the invention to provide a novel control system for a missile powered by a pair of jet engines which is effective to equalize the thrust of the engines to avoid yaw.

It is a further object to provide a novel control system for a jet engine in which the fuel is controlled as a function of ram pressure prior to initiation of combustion, and, after combustion, the fuel is controlled as a function of burner pressure modulated by the position of a shock wave in the inlet at low speeds, as a function of burner pressure modulated by Mach number at high speeds, and solely as a function of burner pressure at intermediate speeds.

It is a still further object to provide a novel control system for a missile powered by a pair of ramjet engines which utilizes a single turbine driven pump to supply fuel to both engines, in which each engine is provided with a fuel control, each fuel control being regulated as a function of the position of a shock wave in the inlet and burner zone pressure in its respective engine, and in which the pump speed is controlled as a function of burner zone pressure to maintain a predetermined air/fuel ratio.

A still further object is to provide a novel control system for a missile powered by a pair of ramjet engines in which a Mach number control, responsive to the ram pressure and static pressure in one engine, directly regulates the fuel feed to that engine, and in which the fuel feed to each engine is regulated inversely as the pressure differential in their burner zones.

A still further object is to provide a novel control system for a missile powered by a pair of ramjet engines in which the pump delivers fuel to both engines at a pressure higher than that required by either engine, each engine including a fuel flow distributor, controlled as a function of combustion chamber pressure, to distribute the fuel to a plurality of burners in the burner zone of each engine.

The attainment of the above objects and other objects will become more evident from a consideration of the following description in conjunction with the accompanying drawings, in which FIGS. 1A, 1B and 1C form a composite representation to schematically illustrate a preferred embodiment in connection with a missile powered by a pair of ramjet engines.

Referring to the drawings, there is illustrated a missile 10 having a pair of ramjet engines 12 and 12′ on opposite sides of a longitudinal center line. As the ramjet engines are substantially the same, a detailed description of one engine will suffice. The ramjet engine 12 will be termed the master engine, in that certain operating conditions are directly controlled therein, to serve as a parameter to control the engine 12′, referred to as the slave engine. Corresponding parts in the slave engine 12′ will bear the same reference character as used in connection with the description of the master engine 12, but will include a "prime".

The engine 12 comprises a tubular shell 14 of generally cylindrical form except for the inlet and outlet ends, wherein the ends are tapered slightly as is conventional in ramjet engines to form an air inlet and exhaust outlet or reaction nozzle. The front end includes a nose cone 16 held in position in the inlet by a series of spaced support members 18, defining between the cone 16 and the shell 14 an annular inlet 20 for supersonic flow of air having a decreasing cross section followed by an increasing cross section. Spaced downstream from the inlet 20 are a burner zone 22, a combustion chamber 24, and a reaction nozzle 26. A launching rocket 28 is shown within the combustion chamber, appearing in dot-dash lines in the launching position and in solid lines during jettisoning. In launching the missile, the rocket 28 is fired to provide the starting thrust to bring the missile up to a predetermined speed at which it can be self-sustaining. The launching rocket may use a solid fuel propellant, and, when the fuel is exhausted, the rocket is jettisoned and an igniter is fired in the combustion chamber to initiate combustion therein.

The forward end of the rocket 28 includes a nose piece 30 which is adapted to be received within a cylinder in the downstream end of the nose cone 16. The nose piece 30 has an annular channel to receive a spring urged latch member 36, which prevents release of the rocket. The latch member 36 is carried by a piston reciprocable in a cylinder and urged toward its latching position by a spring. The piston is moved toward its unlatching position by the admission of fluid under pressure to the cylinder on the side of the piston opposite the spring. The particular means to admit pressure fluid is not shown herein, as it forms no part of the present invention, but it should be understood that such means are timed to unlatch the nose piece 30 and to permit the rocket to jettison, as shown in full lines, when the fuel charge is consumed and the ramjet engine is fired.

A piston 44 within the cylinder is urged against the nose piece 30 by a spring. Piston 44 carries a piston rod 46 extending through the end of the cylinder which is intended to fire the igniter in the combustion chamber and to close a fuel by-pass valve when the ramjet engine is to be started, as will appear more fully hereinafter. A locking pin 50 engages the piston rod 46 to prevent accidental actuation, the locking pin being removed just prior to launching.

The downstream end of the nose cone 30 carries an igniter 52 which projects into the burner zone 22. The igniter is of a type which projects a long hot flame in a downstream direction to ignite the fuel fed by the burners in the burner zone. The igniter includes a firing pin 54 which is urged toward a detonator cap in the igniter by a spring.

The firing pin 54 is held in its "cocked" position by a removable pin 58 engaging an aperture in the firing pin 54. Removal of the pin 58 from the aperture releases the firing pin to fire the igniter.

The burner zone 22 includes a first or upstream fuel burner 62 and a second or downstream fuel burner 64. Fuel is supplied to the burners by a fuel pump 66 by way of a fuel feed conduit 68 delivering fuel to a main control 70, and by a first fuel supply branch 74 to the first fuel burner 62 and by a second fuel supply branch 72 to the second fuel burner 64. A fuel tank 76 is connected with the inlet of the fuel pump 66 by an inlet conduit 78.

The fuel pump 66 is driven by a fluid turbine 80 by means of a connecting shaft 82. Motive fluid for the turbine is supplied from a compressed air supply conduit 84 including a throttle valve 86. The position of the throttle valve is regulated by a pump control 88 which moves a lever 90 connected with the throttle valve. Prior to launching, the throttle valve 86 is maintained in its closed position by a starting solenoid 92 having a movable core 94 engageable with the lever 90 as shown in broken lines. The solenoid 92 is remotely operated by electrical connections 96 through which an electrical impulse can be delivered upon launching to permit the throttle valve 86 to open to initiate fuel feed and operation of auxiliaries driven from the turbine.

An auxiliary control device 98 includes an engine thrust equalizer 100 and a Mach number control element 102, which function to equalize the thrusts of the two ramjet engines 12 and 12', and to directly control the fuel delivery to a metering valve 104 in the main control 70 in the fuel supply line to the ramjet engine 12, as will be described more fully hereinafter.

The main fuel control 70 also includes a pressure regulator 106 in the fuel line, downstream from the metering valve, and a flow divider 108 between the pressure regulator 106 and the burners 62 and 64. The main control 70 also includes a by-pass valve 110, which is maintained open during launching when the power is supplied by the launching rocket 28, and which is automatically closed and maintained closed when the launching rocket is jettisoned and combustion is initiated in the combustion chamber of the ramjet engine, as will be described in greater detail hereinafter.

The fuel feed conduit 68 leading from the pump 66 is connected with the metering valve 104 within the main fuel control 70, and fuel from the metering valve is delivered through a metered fuel line 112 which includes the pressure regulator 106. From the metered fuel line 112, a portion of the fuel passes, by a valve controlled branch 114, to the fuel supply branch 74, and another portion of the fuel passes by a branch 115 to the fuel supply branch 72.

A by-pass branch 116 is connected with the metered fuel line 112, downstream from the pressure regulator 106. The by-pass valve 110 controls the flow of fuel from the branch 116, permitting flow, when open, to the pump inlet 78 by way of a return flow line 118.

The by-pass valve 110 comprises a valve member 120 which is reciprocable within a cylinder 122 including a spring 124 which biases the valve member 120 toward its closed position shown in the drawings. A pressure line 126 connects the by-pass branch with the pressure chamber within the cylinder 122 to assist the spring 124 to close the valve member 120. The movable valve member 120 includes an axial stem 128 projecting into the return flow line 118 and adapted to be engaged and to maintain the valve member 120 in its opened position when contacted by a stop member 130. A spring 132 urges the stop member upward or toward its latching position relative to the end of the stem 128. A cable 134 is connected at one end with the stop member 130 and is connected, at the other end, with the piston rod 46 in the nose cone, whereby the spring which becomes effective when the launching rocket 28 is jettisoned, exerts a pull on the cable to retract the stop member 130 and to unlatch the valve member 120, to permit the by-pass valve 110 to close and to permit fuel to be fed to the combustion chamber of the ramjet engine as will appear more fully hereinafter.

A second cable 136 is connected at one end to the first cable 134 and at its other end to locking pin 58 to release the firing pin 54 and fire the igniter 52 when the rocket is jettisoned.

The metering valve 104 comprises a movable valve element 138 cooperable with a valve seat 140 to regulate the supply of fuel fed to the burners 62 and 64. The movable valve element 138 is connected with a piston 142 adapted to reciprocate within a cylinder 144. A spring 146 within the cylinder 144, interposed between the movable valve member 138 and an abutment 148, urges the valve member 138 toward its seat 140. The movable valve member 138 includes a valve stem 152 connected with a piston 150 adapted to reciprocate within a cylinder 154. The areas of the pistons 142 and 150 are equal. A pressure connection 156, including a restriction 158 and a branch 160, conducts fuel under a controlled pressure to the pressure chamber of the cylinder 154. The pressure in the branch 160 and within the pressure chamber of the cylinder 154 is regulated by a movable pilot valve 162 which varies the bleed of fuel from the open end of the branch 160. The pilot valve 162 comprises an elongated lever pivotally supported by a flexible diaphragm which separates the cylinder 144 from an evacuated chamber 166. A bellows 168 is secured to a wall of the chamber 166, including a perforated wall permitting pressure fluid to be effective within the bellows in an obvious manner. It may be seen, therefore, that the bellows 168 will expand or contract as a function of the pressure within the conduit 180 downstream of the restriction 182, and that the movement of the movable wall 172 of the bellows, as a result of such expansion and contraction, is effective to operate the pilot valve 162 to regulate the the bleed of fuel under pressure from the end of the branch 160 and consequently the pressure of the fuel in the cylinder 154 acting on the lower surface of the piston 150, to control the position of the movable valve member 138 as described fully hereinafter.

The pressure regulator 106 includes a housing 183 having a bellows 184 secured to a wall thereof. The bellows 184 includes a movable wall 186. A spring 188, having one end engaging the housing 183 and the other end engaging the movable wall, tends to expand the bellows in opposition to the pressure upstream of the metering valve 104, which pressure is effective on the outer side of the movable wall by way of an upstream pressure line 190. The interior of the bellows 184 is connected with a downstream pressure line 192, whereby the interior is subjected to the metered pressure in the metered fuel line 112, and whereby the movable wall 186 is subject to the pressure difference across the metering valve 104. The movable wall 186 controls the discharge of fluid from the chamber within the housing 183 by way of a conduit 194 having an inlet in proximity to the movable wall and an outlet connection with the low pressure flow return line 118. The conduit 194 includes a restriction 196 providing a reduced rate of flow. A branch conduit 198, upstream from the restriction 196, is connected with a piston type regulator valve 200 reciprocable within a cylinder 202. Cylinder 202 contains a spring 204, acting on the valve 200 and tending to urge the valve toward its seat in cooperation with the pressure in the cylinder 202, in opposition to the pressure of the metered fuel in the line 112.

A frangible disk 208 in the metered fuel line 112, downstream from the regulator valve 202 and upstream of the flow divider 108, obstructs fuel flow to the burners 62 and 64 until the pressure within the line 112 is raised to a point sufficient to rupture the disk, which occurs when bypass valve 110 is closed, as will appear hereinafter.

As described above, the metered fuel line 112 discharges into a first branch 114 conducting fuel to the first or upstream burner 62, and into a second branch 115 conducting fuel to the second or downstream burner 64. The second branch 115 is unregulated, but the first branch includes a pair of valves in series. A first valve 214 of annular cross section, is adapted to reciprocate within a cylinder 216. A spring 218 urges the valve 214 toward its closed position in opposition to the pressure of the metered fuel in the line 112. The cylinder 216 is connected with the combustion chamber 22 of the ramjet engine 12 by a pressure line 220 and branch 222, whereby the position of the valve 214 is regulated as a function of the pressure within the combustion chamber. A second branch 224 from the pressure line 220 connects with a second valve 226 to regulate the position of said valve as a function of the pressure within the combustion chamber. The valve 226 is adapted to reciprocate within a cylinder 228 including a spring 230 which assists the fluid pressure acting within the cylinder 228 in urging the valve 226 toward its closed position in opposition to the fuel pressure in the branch 114. The valve 226 includes a passage 232 extending therethrough which permits a restricted flow of fuel even when the pressure in the cylinder 228 is sufficient to force the valve 226 against its seat.

The main fuel control 70 also includes a shock wave position sensor 234, including a housing 236 having a fulcrum 238 carried by a wall thereof. The fulcrum 238 supports a pivoted lever 240 cooperable with a bellows 242 having a movable wall 244 tending to urge the lever in a clockwise direction, and a movable wall 246 attached to an outer bellows 248 and an inner bellows 250 tending to urge the lever 240 in a counterclockwise direction. One end of the pivoted lever 240 comprises a pilot valve 252 controlling the discharge of pressure fluid from the end of a pressure branch 254 connected with the conduit 180 downstream from the restriction 182, and thereby regulate the pressure effective within the bellows 168 of the metering valve. The housing 236 also includes a discharge 256 to atmosphere, whereby the pressure fluid allowed to escape from the pressure branch 254 is vented to the ambient atmosphere.

The inner ends of the bellows 248 and 250 are connected with the interior wall of the housing 236, and the space between the two bellows is evacuated, whereby the effective area of the pressure fluid acting on the movable wall 246 is that of the cross section of the inner bellows 250.

The interior of the inner bellows 250 is connected with one end of a conduit 258, the other end being connected with a first shock wave probe 260 disposed adjacent and downstream from the inlet 20. The interior of the bellows 242 is connected with a second shock wave probe 264 by way of a conduit 262. The probe 264 is disposed adjacent the nose cone 16 and upstream from the inlet 20. It will be noted that the cross sectional area of the bellows 242 is greater than that of the inner bellows 250, and therefore, if the pressures within the bellows 242 and 250 are equal, the lever 240 will be urged in a clockwise direction because of the larger effective area of the movable wall 244. On the other hand, if the pressure at the shock wave probe 260 is considerably greater than the pressure at the shock wave probe 264, as occurs under certain conditions of operation, the force acting on the movable wall 246 of the bellows 248—250 will exceed the force acting on the movable wall 244 of the bellows 242, and the lever 240 will be urged in a counterclockwise direction to move the pilot valve 252 away from the discharge end of the pressure branch 254 to reduce the pressure therein and in the bellows 168 of the metering valve.

The Mach number control 102 comprises a housing 266 carrying a pair of opposed abutment walls 268 forming a track for a roller 270 supporting a pivot pin 272 pivotally supporting a lever 274. A link 276 is pivotally connected with one end of the lever 274 and pivotally carried by a lug 278 on the wall of the housing 266 for the purpose of confining movement of the lever 274 in a transverse direction and preventing longitudinal movement. The interior wall of the housing supports a first pressure bellows 280 having a movable wall connected with the lever 274 on one side of the pivot pin 272, and a second pressure bellows 282 having a movable wall connected with the lever 274 on the other side of the pivot pin. It will be observed that pressure fluid within the bellows 280 tends to rotate the lever 274 in a counterclockwise direction about the pivot pin 272, and pressure fluid within the bellows 282 tends to rotate the lever 276 in a clockwise direction. A first evacuated bellows 284 is disposed opposite the bellows 280, the bellows 280 and 284 and the lever 274 being interconnected by a link 285. Similarly, a link 287 interconnects the bellows 282, lever 276 and a second evacuated bellows 286 disposed opposite the bellows 282. The left hand end of the lever 274 includes a pilot valve 288 movable relative to the discharge end of a pressure branch 290 to control the escape of pressure fluid therefrom for a purpose to be explained more fully hereinafter.

The roller 270 is connected with one end of a link 292, whereby the roller can be moved axially of the lever 274 to variably position the pivot pin 272 along the longitudinal slot 293 to vary the moment arms between the pivot pin 272 and the points of connection of the links 285 and 287 to vary the speed setting of the Mach number control 102. The right hand end of the link 292 is connected with one end of a lever 294, whereby rotation of the lever 294 is effective to move the link 292 and the pivot pin 272 along the slot 293. Lever 294 is rotated through a reduction gearing 296 driven by a remotely controlled electrical motor 298, including electrical connections 300 for reversibly controlling the motor 298 in response to a controlled signal to vary the position of the pivot pin 272 and consequently the speed setting of the Mach number control 102. The electrical circuit includes a follow-up potentiometer 302 to rebalance the electrical circuit, in a known manner, whenever the motor 298 is operated.

The housing 266 includes a vent 303 to atmosphere to permit the discharge of pressure fluid escaping from the end of the pressure branch 290.

The interior of bellows 280 is connected with one end of a conduit 304, the other end of which is connected with a ram pressure probe 306 carried in the forward end of the nose cone 16, whereby the internal pressure within the bellows 280 is a function of the ram pressure, which, in turn, is a function of the forward speed of the ramjet engine 12 and the density of the ambient air. The interior of the bellows 282 is connected with one end of a conduit 308, the other end of the conduit being connected with a static pressure probe 310 disposed adjacent the forward tip of the nose cone 16 and extending in a direction transversely of the direction of movement of the ramjet engine 12. Since the pressure sensed by the ram pressure probe 306, when the missile is in flight, is greater than the pressure sensed by the static pressure probe 310, the cross sectional area of the bellows 280 is made less than the cross sectional area of the bellows 282.

The engine thrust equalizer 100 comprises a housing 312 carrying, on an interior wall, a support member 314 pivotally mounting a lever 316 on a fulcrum pin 318. Connected with an interior wall of the housing 312 is a first bellows 320 having a movable wall 322 pivotally connected with one end of the lever 316 by a connection 324, and a second bellows 326 having a movable wall 328 pivotally connected with the other end of the lever 316 by a connection 330, the connections 324 and 330 being disposed equal distances from the pin 318. The left hand end of the lever 316 carries a first pilot valve 332 comprising a generally spool-shaped member mounted for movement relative to the lever by a sliding connection with an aperture in the end of the lever, and including a spring 334 urging the pilot valve toward a valve seat 336. The right hand end of the lever 316 carries a second pilot valve 338 which is identical in construction with the first pilot valve 332 and which includes a spring 340 which urges the pilot valve 338 toward a valve seat 342. In the neutral position of the lever 316, as shown, the pilot valves 332 and 338 engage their respective valve seats 336 and 342 because of the action of the respective springs 334 and 340. Movement of the lever 316 in a clockwise direction will lift the pilot valve 332 from its seat 336, while the slidable connection between the pilot valve 338 and the right hand end of the lever 316 permits relative movement between the pilot valve 338 and the lever, causing a compression of the spring 340 and permitting the pilot valve 338 to remain seated. Conversely, counterclockwise movement of the lever 316 will lift the pilot valve 338 from its seat 342, and the slidable connection between the left hand end of the lever and the pilot valve 332 will permit relative movement without unseating the pilot valve 332.

The valve seat 336 is connected with one end of a pressure line 344, the other end being connected with the pressure conduit 180' downstream from the restriction 182' therein. Similarly, the valve seat 342 is connected with one end of a pressure line 346, the other end being connected with the pressure conduit 180 downstream from the restriction 182 therein. The pressure branch 290, leading to the Mach number control 102, is also connected with the pressure line 346. The interior of the bellows 320 is connected with one end of a pressure line 348, the other end of the line being connected with the pressure conduit 180 upstream of the restriction 182 therein. Similarly, the interior of the bellows 326 is connected with one end of a pressure line 348', the other end being connected with the pressure conduit 180' upstream of the restriction 182' therein. The housing 312 includes a vent 349 leading to the ambient atmosphere. Since the pressure lines 180 and 180' are connected with the total pressure sensors 178 and 178', which sense a condition indicative of the burner pressure and therefore the thrust pressure in the respective ramjet engines 12 and 12', it is evident that the bellows 320 and 326 are subject to respective pressures that vary according to the effective thrusts of the ramjet engines 12 and 12'.

The pump drive turbine control 88 comprises a housing 350 having, on an interior wall, a support 352 pivotally mounting a lever 354. The opposite wall of the housing includes a first bellows 356 having a movable wall 358 pivotally connected with one end of the lever 354 on one side of the pivotal support, and a second compound pressure responsive operator, comprising an outer bellows 362 and an inner bellows 364 having a common movable wall 360 pivotally engaging the other end of the lever 354. The space between the bellows 362 and 364 is evacuated, and the inner ends of the bellows are connected with the wall of the housing 350. The right hand end of the lever 354 carries a pilot valve 366 which cooperates with a valve seat 368 to control the escape of pressure fluid from a pressure branch 374. The interior of the bellows 356 is connected with one end of a pressure branch 370, the other end being connected with the pressure line 348. The interior of the inner bellows 364 is connected with one end of a pressure line 372, the other end being connected with the fuel feed conduit 68 whereby the interior of the bellows 364 is subject to the fuel pump delivery pressure.

The valve seat 368 is disposed at the end of a branch 374, the other end being joined with the pressure line 372. The branch 374 includes a restriction 376, and a branch 378 joins the branch 374, downstream of the restriction 376 and the interior of a cylinder 380 of a servomotor having a piston 382, and a piston rod 384 engaging one end of the throttle valve control lever 90. A spring 386 within the cylinder 380 urges the piston 382 in a direction to permit the opening of the air turbine throttle valve 86 under the force of a spring 388 engaging the lever 90 and moving the lever into contact with the end of the piston rod 384.

The invention also contemplates the use of a starting switch 390 adapted to place the fuel metering valve under the control of the ram pressure probe 306 during the launching of the missile and prior to the initiation of combustion within the ramjet engine, and to place the fuel metering valve under the control of (1) the position of the shock wave in the ramjet inlet at low speeds; (2) the burner zone total pressure at intermediate speeds; and (3) the Mach number control at high speeds, these last three controls becoming effective in turn after combustion occurs within the ramjet engine, as described more fully in detail hereinafter.

The starting switch 390 comprises a housing 392, the interior wall of which carries a support 394 pivotally mounting one end of a movable valve member 396 adapted to close, in one position, a valve seat 398 and in another position, a pair of valve seats 400 and 402. The interior wall of the housing 392 also supports a first bellows 404 and an opposed second bellows 406, both bellows being of the same cross sectional area and engaging opposite sides of the movable valve member 396 for urging the latter in opposite directions. The valve seat 398 is connected at one end of a conduit 408, the other end being connected with the conduit 304, whereby the interior of the housing is subject to the total ram pressure ($P_{total}$) when the movable valve member 396 uncovers the valve seat 398. The valve seat 400 is connected with one end of a conduit 410 having a restriction 412, the other end of the conduit discharging to the ambient atmosphere. The valve seat 402 is connected with one end of a conduit 414 having a restriction 416 therein, the other end of the conduit 414 being connected with the conduit 180 upstream of the restriction 182 therein. The movable valve member 396 includes conventional means, not shown, to maintain it in either extreme position covering the valve seat 398 and uncovering the valve seats 400 and 402, or covering the valve seats 400 and 402 and uncovering the valve seat 398.

The interior of the bellows 406 is connected with the conduit 414, upstream of the restriction 416, by a branch 418, and the interior of the bellows 404 is connected with the reaction nozzle 26 by way of a conduit 420. The interior of the housing 392 is connected with the conduit 180, downstream of the restriction 182, by means of a pressure line 422.

From the foregoing, it will be seen that the interior of the bellows 406 is connected with the total pressure sensor 178 in the burner zone 22, wherein the pressure is indicated at $P_{t_2}$, and that the interior of the bellows 404 is connected with the reaction nozzle 26 wherein the pressure is indicated at $P_{t_3}$. In launching, and prior to initiation of combustion within the combustion chamber 24, there is a conversion of velocity head to pressure head within the ramjet engine, and under such operation, the pressure at $P_{t_3}$ represents the highest pressure point in the engine. The pressure within the bellows 404 will therefore exceed the pressure within the bellows 406, which will move the movable valve member 396 toward its right hand position to uncover the valve seat 398 and to cover the valve seats 400 and 402. After combustion takes place within the combustion chamber 24, the burner zone 22, where the pressure is indicated as $P_{t_2}$, represents the highest pressure point in the engine, which pressure is effective within the interior of the bellows 406 to move the movable valve member 396 toward the left to uncover the valve seats 400 and 402, and to cover the valve seat 398. The movable valve member 396 can be described as a movable member which occupies a position, indicative of the occurrence of combustion within the ramjet engine, to place the fuel metering valve 104 under the control of any one of (1) the position of the shock wave, (2) the total pressure within the burner zone, and (3) the Mach number control, and which occupies a position, if there is no combustion, which places the metering valve under the control of the ram pressure.

Operation

The drawings show, in dot-and-dash lines, the position of the launching rocket motor 28 during the launching of the missile. The power is supplied solely by the two rocket motors 28 and 28'. The by-pass valve 110 is open. Prior to launching, the air throttle valve 86 was held closed by engagement of the core 94 of the solenoid 92 with the end of the lever 90, as shown in broken lines. Upon launching, or shortly thereafter, the solenoid 92 is energized to retract the core 94, permitting the spring 388 to rotate the lever 90 in a counterclockwise direction into contact with the end of the piston rod 384, which fully opens the throttle valve 86 and permits the flow of compressed air from the supply conduits 84 through the blades of the turbine 80 to set into operation the fuel pump 66 and the auxiliaries, not shown, connected with the turbine shaft. The fuel pump delivers fuel through the fuel feed conduit 68 to the closed metering valve 104, and fills the various pressure lines 372, 190, 156 and 160 connected therewith. The pressure of spring 174 moves the pilot valve 162 to close the discharge end of the pressure branch 160, allowing pressure to build up therein to move the piston 150 upwards to open the movable valve element 138, allowing the flow of fuel through the metered fuel line 112, by-pass branch 116 and open by-pass valve member 120 to the return flow line 118 and back to the inlet of the fuel pump 66. Fuel pressure in the pressure line 190 enters the housing 183 of the pressure regulator 106 and enters the conduit 194 and branch 198 to move the regulator valve 200 toward its closed position, assisted by the spring 204, to increase the pressure of the fuel downstream of the movable valve member 138, to maintain a predetermined pressure differential across the member 138 as determined by the strength of the spring 188. The frangible disk 208 prevents the delivery of fuel to the burners 62 and 64. The fuel pressure in the pressure line 372 is effective within the inner bellows 364 to move the movable wall 360 toward a position to prevent flow through the valve seat 368, thus building up the pressure in the branches 374 and 378 downstream of the restriction 376 to move the piston 382 in an upward direction to close the throttle valve 86. However, the upward movement of the movable wall 360 on the lever 354 is opposed by the upward movement of the movable wall 358 of the bellows 356 in response to the pressure in the conduit 180 and pressure line 348 resulting from an increase in pressure in the total pressure sensor 178 indicating the pressure $P_{t_2}$. The pressure within the bellows 356 is a function of the total air pressure in the burner zone 22, and the pressure in the bellows 364 is a function of the fuel delivery pressure. As these pressures act on the lever 354 in opposite directions, and as the effective areas of the moveable walls 358 and 360 are related to the desired air/fuel ratio, it will be seen that the pump drive turbine control 88 not only maintains a predetermined fuel pressure, but maintains a pressure of fuel to assure a predetermined air/fuel ratio. An increase in fuel pressure will move the movable wall 360 upward to restrict the flow of fuel from the valve seat 368 controlled by the pilot valve 366 and a consequent increase in pressure within the cylinder 380, producing an upward movement of the piston 382 and a closing movement of the throttle valve 86 to reduce the speed of the turbine and the rate of fuel feed. Conversely, an increase in air pressure within the bellows 356 produces an upward movement of the movable wall 358, a clockwise movement of the lever 354 and a movement of the pilot valve 366 away from the valve seat 368 to allow the escape of fuel from the branches 374 and 378 and a drop in pressure within the cylinder 380 to move the throttle valve 86 in an open direction to increase the turbine and pump speed to increase the fuel delivery pressure. Fuel escaping from the valve seat 368 leaves the housing 350 by way of the return line 424 and return flow line 118' to the pump inlet 78.

During the launching operation and while the thrust is being delivered by the rocket motors 28 and 28', the pressure $P_{t_3}$ in the nozzle 26 is the highest pressure in the ramjet engine 12, and the pressure within the bellows 404 of the starting switch 390 predominates to move the movable member 396 to the right hand position to uncover the valve seat 398 and to cover the valve seats 400 and 402. Ram pressure sensed by the probe 306 acts through the conduit 304, conduit 408, valve seat 398, interior of housing 392, pressure line 422, and conduit 180 downstream of the restriction 182, to the interior of the bellows 168 to regulate the pilot valve 162 to control the discharge of pressure fluid from the pressure branch 160. As the forward speed increases, the pressure within the connecting conduits increases, raising the movable wall 172 to move the pilot valve 162 clockwise toward the open end of the branch 160 to restrict the flow of fuel therefrom and to increase the pressure of the fuel in the cylinder 154 to move the piston 150 upward against the force of the spring 146 and to move the movable valve member 138 open to allow more fuel to pass through the metering valve 104. During the gradual acceleration of the missile, it will be observed that the metering valve is gradually opened in accordance with the forward speed to gradually increase the fuel flow.

The missile is gradually accelerated under the power delivered by the rocket motors 28 and 28', and eventually reaches a speed at which the ramjet engines can operate. After such a speed is reached, the fuel is consumed in the rocket motors, whereupon the latch members 36 and 36' are retracted by any known means to permit the springs 48 and 48' to jettison the rocket motors and to actuate the pistons 44 and 44' to (1) move the stops 130 and 130' from engagement with the valve stems 128 and 128' of the by-pass valve members 120 and 120' permitting the springs 124 and 124' and the fluid pressure within the cylinders 122 and 122' to close the valve members 120 and 120' to pressurize the metered fuel lines 112 and 112' and (2) to trip the firing pins 54 and 54' to energize the igniters 52 and 52'. This operation is brought about by the cable connections 134, 134', 136 and 136' between the piston rods 46 and 46' and the by-pass valve members 120 and 120' and the firing pins 54 and 54'.

As soon as the by-pass valve members 120 and 120' are closed, the pressure quickly rises in the metered fuel lines 112 and 112', which bursts the frangible disks 208 and 208' and allows fuel to pass to the burners 62, 62', 64 and 64'. The igniters 52 and 52' emit long, hot flames, which quickly ignite the fuel in the burner zones 22 and 22', and combustion is soon initiated within the combustion chambers 24 and 24'. By the time the igniters are consumed, combustion in the ramjet engines is stabilized and continuous combustion is assured without the further need of the igniters. The drawings show the rocket motors 28 and 28′ in full lines in the course of being jettisoned.

In the ensuing description of operation, reference is made only to the events occurring within the master ramjet engine 12, but it should be understood that the same events occur simultaneously within the slave ramjet engine 12′.

When combustion takes place within the combustion chamber 24, the pressure $P_{t_2}$ in the burner zone 22 becomes the highest pressure point in the engine, exceeding the pressure $P_{t_3}$ in the reaction nozzle 26, whereupon the pressure within the bellows 406 of the starting switch 390 will predominate, moving the valve member 396 to the left hand position to cover the valve seat 398 and to uncover the valve seats 400 and 402. At this time, total pressure $P_{t_2}$ as sensed by the pressure sensor 178 is effective through the conduit 180 and restriction 182 within the bellows 168 of the metering valve 104, and by way of the conduit 414, restriction 416, valve seat 402, interior of the housing 392, pressure line 422 and conduit 180 downstream of the restriction 182. A portion of this fluid under pressure is permitted to escape to the ambient atmosphere by way of the valve seat 400 and restricted conduit 410, to prevent the attainment of excessive control pressures within the bellows 168, which bellows must be sensitive to operate under the relatively low pressures delivered by the ram pressure probe 306 during launching, as well as operative under the higher pressure $P_{t_2}$ during combustion.

During this phase of the operation, the pressure of the control fluid in the conduit 180 downstream of the restriction 182 is modulated by the shock wave pressure sensor 234 in accordance with the position of the shock wave at the inlet to the ramjet engine. The shock wave position probes 260 and 264 are positioned at predetermined points in the inlet to control the position of the pilot valve 252 on the end of the lever 240 as a function of the speed. As the speed gradually increases, the pressure of the air in the bellows 242 predominates more and more, gradually restricting the escape of pressure fluid from the end of the pressure branch 254 and correspondingly increasing the pressure within the bellows 168 to gradually increase the fuel delivered by the metering valve 104 as a function of the speed of the missile. As the forward speed continues to increase, the pilot valve 252 eventually moves to a position in which it completely obstructs the escape of pressure fluid from the open end of the pressure branch 254.

During the above operation, the Mach number control has not come into operation, as it is set for governing fuel at the highest speed to be governed. Therefore, the static pressure acting within the bellows 282 is sufficient to overcome the ram pressure within the bellows 280, and the pilot valve 288 obstructs flow from the discharge end of the pressure branch 290.

When the pilot valve 252 of the shock wave position sensor 234 completely obstructs the flow from the discharge end of the pressure branch 254, as described above, the shock wave position sensor 234 no longer governs the fuel flow, and the fuel flow now is governed solely as a function of the pressure $P_{t_2}$ in the burner zone 22 as sensed by the total pressure sensor 178. This pressure, as explained above, is effective through the conduit 180 and restriction 182, and through the conduit 414, restriction 416, valve seat 402, interior of the housing 392 of the starting switch, pressure line 422, and the bellows 168 of the metering valve 104. The restrictions 416 and 412 allow a predetermined drop in pressure and loss of pressure fluid, whereby the controlling pressure effective within the bellows 168 is decreased, but still varies directly as a function of the air speed as sensed by the total pressure sensor 178. This regulation takes place during intermediate speeds, wherein the supply of fuel delivered by the metering valve 104 continues to increase as a function of the air speed of the missile, during which time the pressure regulator 106 maintains a predetermined pressure differential across the metering valve, and the pump drive fuel control 88 operates the fuel pump 66 to maintain a predetermined air/fuel ratio.

As the forward or air speed continues to increase and approach the speed for which the Mach number control 102 is set to regulate, the ram pressure sensed by the probe 306 increases to a value tending to cause the pressure within the bellows 280 to predominate and move the lever 274 in a counterclockwise direction to move the pilot valve 288 from the discharge end of the pressure branch 290 and modulate the pressure of the control fluid acting within the bellows 168 of the metering valve 104. The Mach number control 102 thereupon takes over the control to govern the fuel flow to maintain the predetermined maximum speed. If the speed increases above the predetermined speed for which the Mach number control 102 is set, the pilot valve 288 allows the escape of more pressure fluid from the discharge end of the pressure branch 290 to decrease the pressure within the bellows 168, which, in turn, permits the discharge of more fuel from the discharge end of the pressure branch 160 and the decrease of pressure within the cylinder 154 to allow the spring 146 to move the movable valve element 138 towards the valve seat 140 to reduce the flow of metered fuel and reduce the speed of the ramjet engine. If the speed decreases, the pilot valve 288 moves toward the discharge end of the pressure branch 290 to restrict the flow and to increase the pressure within the conduit 180 and within the bellows 168 and move the movable valve element 138 of the metering valve away from the seat 140 to increase the fuel delivered to the ramjet engine and increase its thrust.

During such operation, the pressure regulator 106 maintains a predetermined constant pressure diffrential across the metering valve 104. As described above, the interior of the bellows 184 is subject to the metered fuel pressure in the fuel line 112, as delivered by the downstream pressure line 192, and the exterior of the bellows is subject to the pressure in the fuel feed conduit 68 as delivered by the upstream pressure line 190. The movable wall 186 is therefore subject to the pressure difference between the fuel feed conduit 68 on the one hand, and the metered fuel line 112 and the spring 188 on the other hand. So long as these forces are in equilibrium, the movable wall 186, functioning as a pilot valve, maintains a predetermined flow of fuel through the conduit 194 and a certain pressure in the interior of the cylinder 202. The restriction 196 permits a constant escape from the conduit 194. An increase of pressure within the metered fuel line 112, resulting from an increased opening of the valve element 138 or from any other cause, produces a movement of the movable wall 186 to restrict the escape of fuel through the conduit 194, causing a drop in pressure within the cylinder 202 and a consequent opening movement of the regulator valve 200 to allow more fuel to pass the valve 200 and to produce a pressure drop in the metered fuel line 112, whereby the pressure differential is restored. Conversely, a decrease of pressure within the metered fuel line 112, resulting from any cause, is followed by a closing movement of the regulator valve 200 to restore the pressure differential across the metering valve.

The two valves 214 and 226 in the flow divider are operated sequentially as a function of the combustion chamber pressure to distribute the fuel to the burners 62 and 64 as a function of the combustion chamber pressure sensed by the pressure connection 220. As the pressure within the combustion chamber 24 increases, the valve 226 is gradually closed. This valve, even when moved against its valve seat, cannot completely obstruct fuel flow to the upstream burner 62 because of the passage 232 therein. The valve 214 is also under the control of the pressure within the combustion chamber 24 to regulate the flow to the valve 226 and to the burner 62, being gradually closed as a function of pressure increase within the combustion chamber 24. When the pressure within the combustion chamber attains a predetermined maximum, the valve 214 is completely closed. Fuel delivery to the downstream burner 64, by way of the branch 115 and fuel supply branch 72, is not governed by the flow divider.

The engine thrust equalizer 100 maintains an equal thrust in the two ramjet engines 12 and 12'. As described above, the Mach number control 102 regulates the fuel supply only to the master ramjet engine 12, and each ramjet engine has a separate main fuel control responsive to the position of the shock wave, and to the pressure within the burner zone and within the combustion chamber. As the reaction thrust of each engine is a direct function of the pressure $P_{t_2}$ within the burner zone 22, the thrust equalizer 100 senses the difference in pressures between the burner zones of the two engines and effects a modulation of the fuel control pressure in the engine having the higher pressure as a function of the pressure difference. If the pressure $P_{t_2}$ within the ramjet engine 12 should exceed the pressure $P_{t_2}$ within the ramjet engine 12', the expansion of the bellows 320 will move the lever 316 counterclockwise to raise the pilot valve 338 from its seat 342 to permit the escape of pressure fluid from the pressure line 346 to effect a closing movement of the metering valve 104. Conversely, should the pressure within the ramjet engine 12' exceed the pressure within the ramjet engine 12, the expansion of the bellows 326 will move the lever 316 in a clockwise direction to raise the pilot valve 322 from its seat 336 to vent pressure fluid from the pressure line 344 and effect movement of the metering valve 104' towards a closed position to restore an equal thrust.

Remotely operated means can produce forward or reverse rotation of the motor 298 of the Mach number control 102 to shift the position of the pivot pin 272 relative to the links 285 and 287 to selectively vary the speed setting. Movement of the pivot pin 272 toward the right results in a decreased speed setting, and movement toward the left results in an increased speed setting.

While the invention discloses the use of fluid pressure operated servomotors for the various control valves, it is evident that the invention can utilize electrically actuated servomotors to obtain the same operation, and that such a modification is considered to lie within the scope of the invention.

Having fully disclosed a preferred embodiment of the invention, it will be understood that various modifications will be readily apparent to persons skilled in the art, and that the scope of the invention is not to be construed as limited to the specific embodiment disclosed, but according to the scope of the appended claims.

I claim:

1. A power plant for a missile, comprising: a plurality of jet engines, each engine including an air inlet, a burner zone, a combustion chamber and a reaction nozzle; a single pump means; a supply line interconnecting the pump means with the burner zones of said jet engines for supplying fuel thereto; auxiliary control means, responsive to the pressure of the air in only one of said jet engines, to regulate the pump means delivery pressure; and separate main control means for each engine regulating the fuel feed supply to each engine as a function of the burner zone pressure of the respective engine.

2. A power plant for a missile as defined in claim 1, in which the pump means comprises a centrifugal pump delivering fuel at a pressure higher than that required in the jet engines, and in which each burner zone includes a pair of burners, a branch duct supplying fuel to each burner, and in which each main control means includes a flow divider controlling the distribution of fuel flow through the branch ducts.

3. A power plant for a missile as defined in claim 1, in which the pump means comprises a centrifugal pump delivering fuel at a pressure higher than that required in the jet engines, and in which each burner zone includes a pair of burners, a branch duct supplying fuel to each burner, and in which each main control means includes a pair of throttle valves disposed in series in one of said branch ducts controlling the fuel flow therethrough, one of said valves closing before the other, said first closing valve including means permitting a restricted flow when closed.

4. A power plant for a missile as defined in claim 1, in which the auxiliary control means is responsive to the fuel delivery pressure to maintain a delivery pressure to each jet engine to provide a predetermined air/fuel ratio.

5. A power plant for a missile as defined in claim 1, in which the main control means for each jet engine includes a metering valve disposed in the fuel supply line between the pump means and the burner zone.

6. A power plant for a missile as defined in claim 1, in which each engine includes a pair of burners, a separate branch duct supplying fuel to each burner, and in which the main control means for each jet engine includes a fuel flow divider distributing fuel to each branch duct, means, responsive to the pressure in the burner zone in the respective engine, regulating the distribution of fuel flow to the burners, and a metering valve in the supply line upstream of the fuel flow divider.

7. A power plant for a missile as defined in claim 1, in which each engine includes a pair of burners, a separate branch duct supplying fuel to each burner, and in which each main control means for each jet engine includes a fuel flow divider in the supply line, means, responsive to the pressure in the burner zone in the respective engine, regulating the distribution of fuel fed to the burners, a metering valve in the supply line upstream of the fuel flow divider, and means controlling the pressure differential across the metering valve.

8. A power plant for a missile, comprising: a plurality of jet engines, each engine including an air inlet, a burner zone, a combustion chamber and a reaction nozzle, one of said engines being a master engine to regulate the thrust of the other engines; a fuel pump; a supply line interconnecting the fuel pump with the burner zone in each engine; an auxiliary fuel control regulating the fuel pump delivery pressure as a function of the ram pressure in the master engine to maintain a predetermined air/fuel ratio; a main fuel control for each engine including a metering valve in the supply line to the respective engine; and means, responsive to the position of a shock wave in the inlet to the respective engine, regulating the position of the metering valve for the respective engine.

9. A power plant as defined in claim 8, including an air driven turbine connected with said fuel pump, in which said auxiliary fuel control regulates the speed of the turbine to regulate the delivery of said fuel pump.

10. A power plant as defined in claim 8, including means, responsive to the fuel delivery pressure, modulating said auxiliary control whereby said fuel pump maintains a predetermined air/fuel ratio in the combustion chambers.

11. A power plant as defined in claim 8, including a Mach number control, responsive to the air speed of said master engine, regulating the position of the metering valve in the main control for the master engine.

12. A power plant as defined in claim 8, including means sensing the total pressure in the burner zone of the master engine, means sensing the total pressure in the burner zone of another engine, and means, responsive to the pressure difference between said burner zones, to vary the fuel supplied by the metering valves of the respective engines.

13. A power plant as defined in claim 8, including means sensing the total pressure in the burner zone of the master engine, means sensing the total pressure in the burner zone of another engine, and means, responsive to the pressure difference between said burner zones, to vary the fuel supplied by the respective metering valves inversely as a function of said pressure difference.

14. A power plant for a missile, comprising: a plurality of jet engines, each engine including an air inlet, a burner zone having a plurality of burner means therein, a combustion chamber and a reaction nozzle, one of said engines functioning as a master engine to regulate the thrust of the other engine or engines; a fuel pump; a supply line interconnecting said pump and the burner means in each engine; means, responsive to the total pressure in the burner zone of the master engine and to the pump delivery pressure to regulate the fuel delivery pressure to provide a predetermined air/fuel ratio to the engines; a main control means for each engine including a metering valve and a pressure regulator in the supply line to the respective engine; means, responsive to the total pressure difference between the engines' burner zones, modulating the fuel delivery from the metering valve of each engine inversely as a function of such pressure difference; means sensing the position of a shock wave in each engine inlet, controlling the fuel delivered by the metering valve for the respective engine; means, responsive to the pressure in the combustion chamber of each engine, regulating the distribution of the fuel delivered to the burner means of the respective engine; said main control means for the master engine including means sensing a ram pressure induced by the forward speed of the master engine, modulating the opening of the metering valve of the master engine prior to combustion in the combustion chamber therein; and control means sensing the Mach number of the master engine, modulating the opening of the metering valve of the master engine at high speeds.

15. A power plant as defined in claim 14, including means to place the metering valve of the master engine under the control of the ram pressure prior to the occurrence of a combustion condition in the combustion chamber of the master engine, and placing the metering valve of the master engine under the control of the position of a shock wave in the air inlet at low speeds, and under the control of the Mach number control at high speeds.

16. A power plant as defined in claim 14, in which the metering valve of the master engine is directly modulated and the metering valve of the other engine or engines is indirectly modulated by the ram pressure prior to combustion in the combustion chamber of the master engine; in which the metering valve of the master engine and other engine or engines is directly modulated by the position of a shock wave in the inlet of the respective engines at low speeds after combustion therein; in which the fuel supply to each engine is controlled exclusively as a function of the burner zone pressure at intermediate speeds, and in which the metering valve of the master engine is directly modulated and the metering valve of the other engine or engines is indirectly modulated as a function of the Mach number control of the master engine at high speeds.

17. A power plant as defined in claim 14, including means, responsive to a condition indicative of combustion in the combustion chamber of the master engine, placing the metering valve of the master engine under the control of the ram pressure prior to combustion in said combustion chamber, and placing the metering valve of the master engine under the control of the position of a shock wave in the engine inlet at low speeds, and under the control of the Mach meter control at high speeds.

18. A power plant as defined in claim 14, in which said means responsive to a condition indicative of combustion includes a first pressure sensing means responsive to the pressure in the burner zone of the master engine, a second pressure sensing means responsive to the pressure in the reaction nozzle of the master engine, and means responsive to the pressure difference between the burner zone and the reaction nozzle, placing the metering valve of the master engine under the control of the ram pressure, shock wave position, and Mach number control.

19. A power plant as defined in claim 17, in which the metering valve is connected with a fluid pressure servomotor, and in which the ram pressure sensing means, shock wave position sensing means and Mach number sensing means produce a pressure varying as a function of the forward speed, shock wave position, and air speed, respectively, and in which said means responsive to a condition indicative of combustion includes a first pressure sensing means responsive to the pressure in the burner zone, a second pressure sensing means responsive to the pressure in the reaction nozzle of the master engine, and a valve member, connected with said first and second pressure sensing means, connecting said servomotor with said ram pressure sensing means when there is no combustion in the combustion chamber of said master engine, and connecting said servomotor with said shock wave position sensing means and with said Mach number sensing means when combustion occurs in the combustion chamber of the master engine.

20. A fuel control system for a missile powered by a jet engine having an air inlet, a burner zone having burner means, a combustion chamber and a reaction nozzle, and means to supply fuel to said burner means including a pump and a conduit interconnecting the pump and the burner means, comprising: a metering valve in said conduit; means responsive to the position of a shock wave in said inlet regulating the opening of said metering valve at low speeds; means responsive solely to the pressure in the burner zone regulating the opening of said metering valve at intermediate speeds; and means responsive to the Mach number of the missile at high speeds regulating the opening of said metering valve.

21. A fuel control system as defined in claim 20, including a servomotor connected with said metering valve, means supplying a fluid under pressure to said servomotor, and in which said means responsive to the position of a shock wave, said means responsive solely to burner zone pressure, and said means responsive to the Mach number of said missile, include movable members modulating said fluid under pressure.

22. A fuel control system as defined in claim 21, in which said means supplying a fluid under pressure comprises a connection sensing the total pressure in said burner zone.

23. A fuel control system as defined in claim 20, including a pressure regulator maintaining a constant predetermined pressure differential across the metering valve.

24. A fuel control system as defined in claim 20, in which said burner means comprises a plurality of burners and branch ducts from said conduit supplying each burner, and a flow divider comprising a control means in at least one of said branches.

25. A fuel control system as defined in claim 24, in which said flow control means of the flow divider comprises at least one valve responsive to the pressure within the combustion chamber.

26. A fuel control system as defined in claim 24, in which said flow control means comprises a pair of valves disposed in series, and means regulating said valves as a function of the combustion chamber pressure.

27. A fuel control system as defined in claim 24, in which said flow control means comprises a pair of valves disposed in series, and means regulating said valves as a function of the combustion chamber pressure, one of said flow control valves operable to permit a minimum flow even when in closed position, and the other flow control valve being disposed upstream of said one valve to control the flow thereto.

28. A fuel control system as defined in claim 24, including a pressure regulator disposed between said metering valve and said flow divider.

29. A fuel control system as defined in claim 20, including means, independent of said engine, driving said fuel pump to deliver fuel under a pressure at all times in excess of the pressure fed to the engine.

30. A fuel control system as defined in claim 20, including means, sensing the fuel pump delivery pressure and the total pressure in the burner zone, regulating the pump speed to provide a delivery pressure to maintain a predetermined air/fuel ratio in the combustion chamber.

31. A fuel control system for a jet engine used for powering a missile, said engine including an air inlet, a burner zone having burner means, a combustion chamber and a reaction nozzle, fuel ignition means in said combustion chamber, and means to supply fuel to said burner including a pump and a conduit interconnecting the pump and burner means, comprising: a metering valve in said conduit; means sensing a ram pressure varying as a function of the movement of the missile; means sensing the position of a shock wave in the inlet; means sensing the total pressure in said burner zone; and a Mach number control; and means, responsive to a condition indicative of combustion in said combustion chamber, placing said metering valve under the control of said ram pressure sensing means prior to attainment of combustion conditions in said combustion chamber; and placing said metering valve under the control of said shock wave position sensing means, total pressure sensing means, and Mach number control after attainment of combustion conditions in said combustion chamber.

32. A fuel control system as defined in claim 31, in which said metering valve is under the control of said shock wave position sensing means at low speeds, under the exclusive control of said total pressure sensing means at intermediate speeds, and under the control of said Mach meter control at high speeds.

33. A fuel control system as defined in claim 31, including a fluid pressure motor operatively connected with said metering valve, conduit means interconnecting said ram pressure sensing means and said fluid pressure motor, a source of pressure fluid connected with said fluid pressure motor, said shock wave position sensing means, total pressure sensing means, and Mach number control including means modulating said pressure fluid as a function of shock wave position, total pressure, and missile air speed to control the fuel fed by said metering valve.

34. A fuel control system as defined in claim 31, including variable speed means to drive the fuel pump.

35. A fuel control system as defined in claim 31, including variable speed means to drive the fuel pump, and means responsive to the difference between the burner zone pressure and the fuel pump delivery pressure to maintain a predetermined air/fuel ratio in the combustion chamber.

36. A fuel control system as defined in claim 31, including means responsive to the pressure difference across the metering valve to maintain a predetermined pressure differential.

37. A fuel control system as defined in claim 31, in which said burner means comprises a plurality of burners, branch ducts from said conduit supplying each burner, and a flow divider comprising a control means in at least one of said branches.

38. A fuel control system as defined in claim 37, in which said flow control means comprises at least one valve responsive to the pressure within the combustion chamber.

39. A fuel control system as defined in claim 37, in which said flow control means comprises a pair of valves disposed in series, and means to regulate said valves as a function of the combustion chamber pressure.

40. A fuel control system as defined in claim 37, in which said flow control means comprises a pair of valves disposed in series, and means to regulate said valves as a function of the combustion chamber pressure, one of said flow control valves permitting a minimum flow even when in closed position, and the other flow control valve being disposed upstream of said one valve to control the flow thereto.

41. A fuel control system as defined in claim 37, including a pressure regulator disposed between said metering valve and said flow divider.

42. A fuel flow divider for a jet engine having an air inlet, a burner zone, a combustion chamber and a reaction nozzle, said burner zone including a plurality of burners, one of said burners being disposed upstream relative to another burner, means supplying fuel under pressure to said burners, said means including a branch to each burner, and valve means controlling fuel flow to only one of said branches, responsive to the combustion chamber pressure, dividing the flow of fuel to said burners, the fuel flow through the other branch or branches being unrestricted, said valve means comprising a pair of valves arranged in series in the branch connected with the upstream burner, one of said valves including a passage therethrough to permit a minimum fuel flow when in valve seat engaging position.

References Cited in the file of this patent
UNITED STATES PATENTS

| | | |
|---|---|---|
| 2,616,254 | Mock | Nov. 4, 1952 |
| 2,724,239 | Fox | Nov. 22, 1955 |
| 2,739,444 | Chamberlain | Mar. 27, 1956 |
| 2,851,856 | Harris et al. | Sept. 16, 1958 |
| 2,857,742 | Drake | Oct. 28, 1958 |
| 2,861,420 | Lewis | Nov. 25, 1958 |
| 2,874,540 | Esmeier et al. | Feb. 24, 1959 |

FOREIGN PATENTS

| | | |
|---|---|---|
| 791,062 | Great Britain | Feb. 19, 1958 |